US012694306B2

(12) United States Patent
Saxena et al.

(10) Patent No.: US 12,694,306 B2
(45) Date of Patent: Jul. 28, 2026

(54) MACHINE LEARNING PIPELINE WITH DATA QUALITY FRAMEWORK

(71) Applicant: ORACLE FINANCIAL SERVICES SOFTWARE LIMITED, Mumbai (IN)

(72) Inventors: Sharoon Saxena, Bhopal (IN); Veresh Jain, Bangalore (IN); Rahul Yadav, Behror (IN)

(73) Assignee: Oracle Financial Services Software Limited, Mumbai (IN)

( * ) Notice: Subject to any disclaimer, the term of this patent is extended or adjusted under 35 U.S.C. 154(b) by 966 days.

(21) Appl. No.: 17/851,267

(22) Filed: Jun. 28, 2022

(65) Prior Publication Data

US 2023/0419130 A1     Dec. 28, 2023

(51) Int. Cl.
*G06N 5/02*        (2023.01)
*G06N 20/00*      (2019.01)
*G06N 20/20*      (2019.01)

(52) U.S. Cl.
CPC ............. *G06N 5/027* (2013.01); *G06N 20/00* (2019.01); *G06N 20/20* (2019.01)

(58) Field of Classification Search
CPC .............................. G06N 20/00; G06N 20/20
See application file for complete search history.

(56) References Cited

U.S. PATENT DOCUMENTS

2019/0251474 A1 *  8/2019  Bigaj ...................... G06N 20/00
2020/0082270 A1 *  3/2020  Gu ......................... G06N 3/045
2022/0101182 A1 *  3/2022  Patel ...................... G06N 20/00
2022/0164698 A1 *  5/2022  Chaudhary .............. G06N 5/04
2022/0343109 A1 * 10/2022  Haile ...................... G06N 7/01

OTHER PUBLICATIONS

Gupta, Nitin, et al. "Data Quality Toolkit: Automatic assessment of data quality and remediation for machine learning datasets." arXiv preprint arXiv:2108.05935 (2021). (Year: 2021).*
Amazon, Amazon Machine Learning Developer Guide (Version Latest); pp. 1-21, downloaded on Jun. 28, 2022 from: https://docs. aws.amazon.com/machine-learning/latest/dg/machinelearning-dg. pdf.

* cited by examiner

*Primary Examiner* — Eric Nilsson
(74) *Attorney, Agent, or Firm* — Kraguljac Law Group LLC

(57)            ABSTRACT

Systems, methods, and other embodiments associated with a data quality framework for a machine learning pipeline are described. In one embodiment, a method includes receiving an input dataset prior to training a machine learning model with the input dataset. The input dataset, having data records in column tabular form, is analyzed to determine a data quality of the input dataset prior to training the machine learning model. A data quality score is generated that represents an overall quality of the input dataset, where the data quality score is generated based on a combined ensemble of at least two factors selected from (i) an abundance factor, (ii) a completeness factor, and (iii) a dimension efficiency factor. Based on the data quality score, the input dataset is either permitted or prohibited from continuing in the machine learning pipeline, and corrective actions may be performed.

20 Claims, 7 Drawing Sheets

500

505

510

| Categorical Variable (Column) | Value 1 | Value 2 | Value 3 | Value 4 |
|---|---|---|---|---|
| Value 1 | 1 | 0 | 0 | 0 |
| Value 2 | 0 | 1 | 0 | 0 |
| Value 3 | 0 | 0 | 1 | 0 |
| Value 4 | 0 | 0 | 0 | 1 |
| Value 1 | 1 | 0 | 0 | 0 |
| Value 3 | 0 | 0 | 1 | 0 |

Sample Report on Input Dataset

Number of Records: 28 million
Number of Features: 41

| Metric | Value | Remarks |
|---|---|---|
| Data Quality Score | 0.965 | Data is exceptionally high quality |
| Abundance Factor | 1 | Data is plenty, will aid in high model stability |
| Completeness Factor | 1 | Data has ideal density, no partially empty records |
| DEF | 0.902 | Very high number of features, optimal for ML models |
| High Cardinal Columns | 4 | These features will break the abundance of data |
| High VIF Columns | 0 | There are no redundant features |
| High Missing Value Columns | 0 | There are no features with high missing values |
| Recommended Features | 37 | These columns are suitable for predictive modeling |

FIG. 6

MACHINE LEARNING PIPELINE WITH DATA QUALITY FRAMEWORK

BACKGROUND

In the past decade, machine learning has been an indispensable asset for any organization. The adoption of machine learning (ML) techniques is at an all-time high and rapid progress is being made on leading edge machine learning techniques. However, there has been very little progress made on the data that controls and/or trains machine learning models.

Publicly available statistics mention that data being acquired is growing exponentially each year, which essentially serves as the fuel for machine learning. However, the quality of data used for training a machine learning model remains questionable. The data quality issue on its face seems to be very small but has a snowball effect down the machine learning pipeline and can lead to many undesirable outcomes.

In prior machine learning systems, there is a knowledge gap between data experts and the machine learning experts. The data experts (of a particular domain of data) generally do not understand the restrictions of machine learning techniques. On the other side, the machine learning experts generally have difficulties understanding the features in data that would help them build an ML model. As a result, more often than not, an entire dataset is used for the ML training process regardless of the content. This leads to the garbage-in, garbage-out problem that is a widely known principle in the field of computer science. This principle simply states that if garbage inputs are provided to any procedure, the procedure will give out garbage results.

The machine learning domain also conforms to this principle. This means that if the quality of ingested data in a ML model is questionable, the predictions of that ML model are also going to be questionable. As result, to obtain an ML model that is trained with poor quality data, ML experts have to rigorously perform model tuning processes so that the ML model may possibly generate significantly improved results. Typically, however, the ML model remains unstable and only achieves marginal improvements even after costly and time intensive tuning. Furthermore, such ML models require frequent re-training as data flow is everchanging and the ML model will not understand new data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 5 illustrates an example cardinality table associated with determining cardinality of features from a dataset, in one embodiment.

FIG. 6 illustrates an example analysis report that may be generated by the data quality framework after analysis of an input dataset, in one embodiment.

DETAILED DESCRIPTION

Systems and methods are described herein that implement a Data Quality Framework (DQF) as part of a machine learning pipeline. In one embodiment, the data quality framework is configured to autonomously identify the quality of data, which may have millions or billions of records, prior to the data being input to a machine learning model. Based on the determined quality of the data, the present system provides a mechanism to take corrective actions to clean or correct certain aspects of the data before feeding the data into a machine learning (ML) model. As such, the present data quality framework functions as a gatekeeper to a training process of an ML model in the machine learning pipeline. For example, collected data that is supplied for training purposes is not permitted to pass to the ML model until the quality of the collected data is sufficiently good (e.g., meets a threshold quality level) as determined by the present system.

In one embodiment, the data quality framework (DQF) is configured to mitigate issues arising from training machine learning models with poor quality data. In one embodiment, the data quality framework generates a data quality score for an input dataset by using an ensemble of statistical techniques in conjunction with each other. The data quality score may then be used to initiate corrective actions to improve the quality of input dataset. The quality analysis may then be repeated until the data quality score is sufficiently good to allow the input dataset to be passed down the pipeline and ingested into an ML model during a training phase.

In one embodiment, the input data may be submitted directed to the data quality framework or automatically intercepted by the data quality framework prior to the input data being used for training a ML model. After quality analysis, the data quality framework may generate a report that may quantitatively specify quality parameters and may generate recommended actions that can be taken to improve the quality of the input data.

Figure 1:
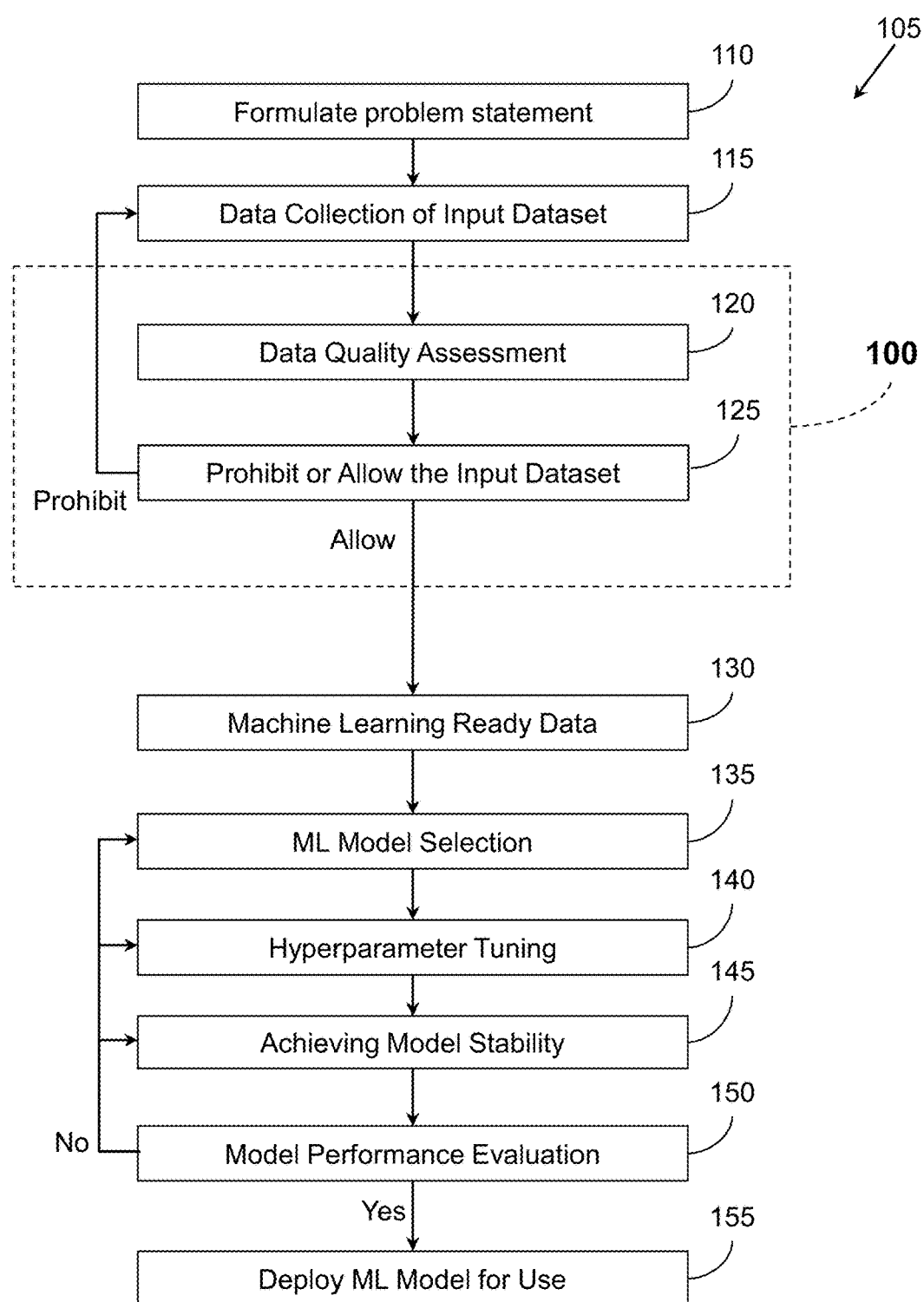
FIG. 1 illustrates one embodiment of a machine learning pipeline including a data quality framework.

With reference to FIG. 1, one embodiment of a data quality framework 100 (also referred to as system 100) is shown as implemented in an example machine learning (ML) pipeline 105. Illustrated components of the machine learning pipeline 105 may vary in different embodiments and may vary in different types of pipelines. Thus, the present system is not limited thereto. The data quality framework 100 may be implemented/integrated as part of any type of machine learning pipeline such that an input dataset is first processed by the data quality framework 100 prior to the input dataset being used to train a machine learning model. In another embodiment, the data quality framework 100 may be configured as a stand-alone application or tool that can be executed to analyze a dataset prior to submitting the dataset to a machine learning developer.

In one embodiment, as an overview, the data quality framework 100 analyzes data records from the input dataset and applies statistical methods on the dataset to assess an overall quality of data. Based on the analysis, quality parameters are generated and recommended quality improvements and/or corrective actions may be generated as recommendations to improve the quality of the input dataset. In one embodiment, the data quality framework 100 generates a data quality score on the input dataset composed of a number of factors that characterize different aspects of the input dataset. The data quality framework 100 may also filter the input dataset looking for specific portions of data that may hinder the training of an ML model. These aspects are described in more detail below.

With reference to FIG. 1, the ML pipeline 105 may include a number of actions that are performed to create, train and deploy an ML model. The actions are not necessarily sequential. In one embodiment, the ML pipeline 105 may be implemented in an application including a graphical user interface that provides the actions as available options and allows for input from a user.

At block 110, to initiate the creation of an ML model, a problem statement is formulated. This may include determining what the ML model will predict and/or what a target answer will be. The type of predictions or the type of ML model is not part of this disclosure.

At block 115, data is collected that will form an input dataset to train the ML model. This may include retrieving and aggregating data from one or more data sources where the data has been collected previously over some time period. For example, a corporation may include multiple offices where each office collects data about some service X. The data collected from each office over a designated time period may be regarded as one data source (or a component dataset). In another example, when using financial datasets, the input dataset is generally an amalgamation of several smaller component datasets from different financial departments. The smaller component datasets from different departments may be contained in separate database sources and the data maybe generally fetched (via network communications) from the database sources on an ad-hoc basis, in one embodiment.

Of course, a data source may contain data that is not relevant to the ML model. Thus, the data collected for use with the ML model should be related to the formulated problem statement. In one embodiment, data querying may be used to identify specific data records from a data source in order to collect specified types of data records.

In one embodiment, the data collected from each data source is configured as tabular data having rows and columns of data. In a given dataset, each row may have the same number of columns where each row represents one data record, and each column represents one feature in the data record. In general, the data records (rows) are independent of each other. Since the input dataset may be aggregated from multiple smaller datasets from multiple data sources, each smaller dataset may be different from each other in terms of numbers of rows and columns and types of data.

Once the input dataset is collected, the data quality framework 100 is performed on the input dataset. Blocks 120 and 125 designate components of the data quality framework 100, which are performed on the input dataset prior to being used in the ML model. At block 120, an assessment of data quality is determined.

In one embodiment, an ensemble of statistical methods is performed on the input dataset to assess an overall quality of data in the input dataset. For example, a data quality score is generated to represent the overall quality that is determined. In general, an ML model will not produce accurate predictions or results when trained with poor quality data.

At block 125, based on the data quality score, the data quality framework controls the flow of the ML pipeline 105 by either allowing the flow to proceed or prohibiting the process from continuing to the next stage. In this manner, the data quality framework 100 is configured as a gatekeeper in the machine learning pipeline.

In response to the data quality score not meeting a specified quality threshold value, the input dataset is judged to have poor or otherwise insufficient quality and the ML process is prohibited from proceeding. One or more alert notifications may be generated, and corrective actions may be performed to modify and/or correct the data from the input dataset. The process then repeats with the modified input dataset to generate an updated data quality score until the updated data quality score meets or exceed the specified quality threshold value. Additional details are discussed with reference to FIGS. 2 and 3.

In response to the data quality score meeting the specified quality threshold value, the ML process is permitted to continue. At block 130, the input dataset is deemed as being machine learning ready data that may be used to train the ML model.

At block 135, an ML model may be selected. The user interface of the ML pipeline 105 may provide one or more different types of models as selectable options, which may include regression, binary classification, and/or multiclass regression. Details of the ML model types are beyond the scope of this disclosure and are not described.

The selected ML model is then trained using the approved input dataset from block 130. Training may include a number of actions, for example, blocks 140, 145, and 150, in one embodiment. Generally describing these actions, hyperparameter tuning 140 may involve selecting hyperparameters that are used to control the learning/training process of the ML model. At block 145, the ML model may be tested to determine if the trained ML model's predictions are stable. This may involve determining that the model's predictions do not change significantly when different types of test input data are fed to the ML model.

For example, if real-time data used for testing changes significantly as compared to the training data, then the ML model may not provide accurate results. At block 150, performance of the ML model is evaluated using different types of test data. If the ML model does not perform as expected, then one or more of the previous actions from blocks 135-150 may be repeated until the ML model performs at a desired level. Once completed, the ML model may be deployed for use (block 155).

By incorporating the data quality framework 100 in the ML pipeline, higher quality data is ensured to be used during the ML model training process. This provides an improvement to the ML pipeline. Since the ML model training process is expensive in terms of time, computing resources used, and cost, the training process is made more efficient by reducing the number of iterations required (e.g., blocks 140, 145, 150) when the input dataset is high quality data.

For example, without the present data quality framework 100, poor quality data may be fed to a ML model and the garbage-in, garbage-out principle applies. Thus, if the quality of ingested data in the ML model is questionable, the predictions of the ML model are also going to be questionable. More often than not, using poor quality data leads to unstable ML models. These unstable models only tend to perform well over very specific data and are not robust to slight changes in the input data during the prediction phase after the ML model is deployed. As a result, these unstable models tend to reach the end of their lifecycle fairly early as the data flow is everchanging. Therefore, such ML models require frequent re-training. With the present system, the stability of an ML model is significantly improved.

Furthermore, in prior systems, to obtain a sufficiently functioning ML model from poor quality data, model tuning and testing must be rigorously performed repeatedly to obtain significant prediction results. Some of the challenges and problems of ML model tuning with poor input data included: repeated trial and error steps; added computationally intensive tuning; only marginal improvements were observed in the ML model; and ML models were unstable. With the present system, ML model tuning is significantly improved by determining upfront that the input dataset has a specified high degree of quality.

Figure 2:
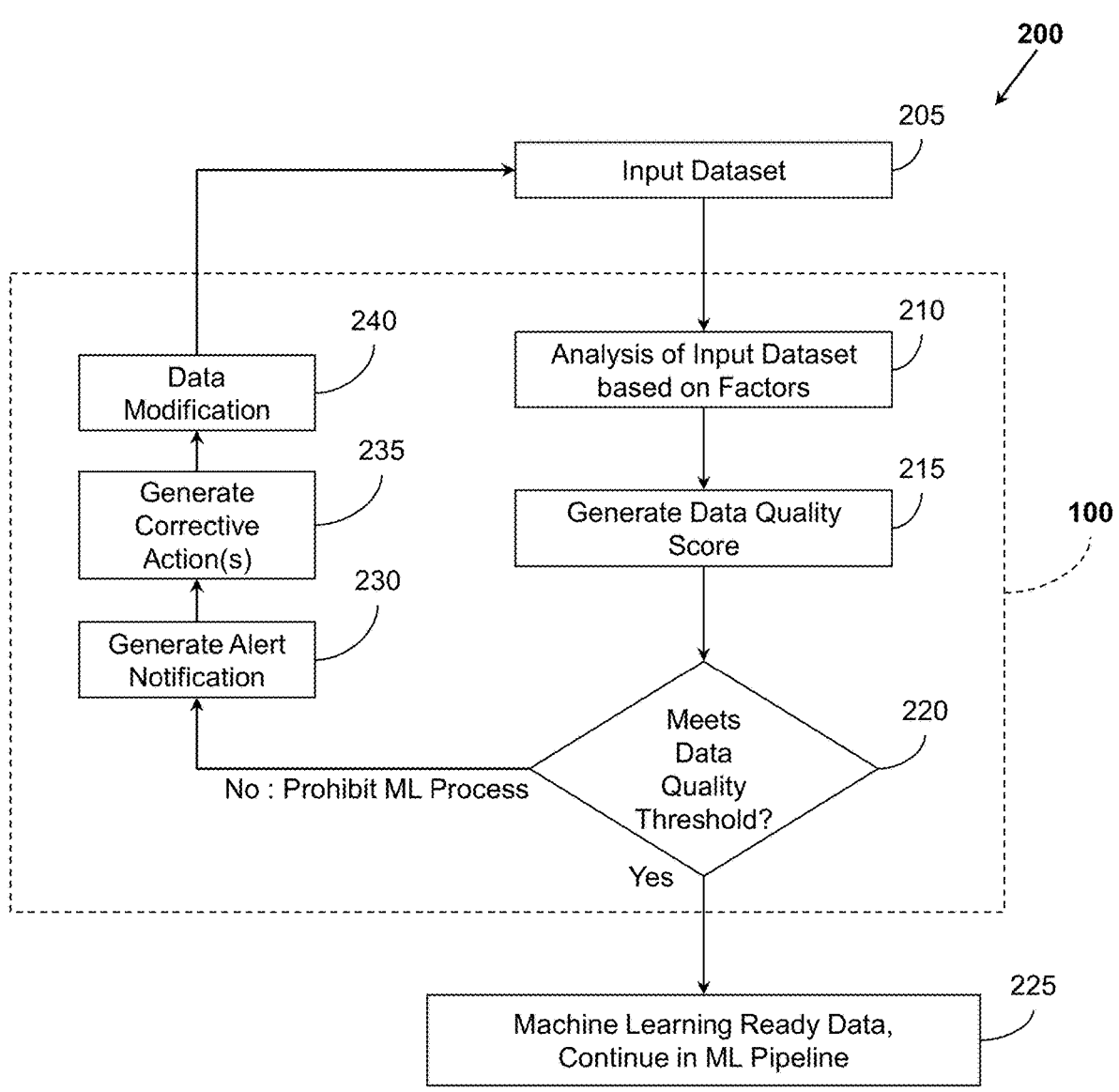
FIG. 2 illustrates one embodiment of a method associated with the data quality framework for assessing the quality of an input dataset.

With reference to FIG. 2, one embodiment of a quality check method 200 is illustrated that is associated with the data quality framework 100 of FIG. 1 (also referred to as system 100). The method 200 is implemented in a computing system and is configured to determine a data quality of an input dataset prior to training a machine learning model.

At block 205, the input dataset is selected and/or retrieved from one or more data sources, as previously described. In one embodiment, the input dataset is configured as tabular data having rows and columns of data where the data records (rows) are independent from each other. This is opposed to time-series data, for example, that is dependent and/or correlated to each other.

At block 210, the input dataset is analyzed by the data quality framework 100 prior to being used in training an ML model. In one embodiment, a selected option may be presented on a user interface to initiate the analysis of the input dataset. In another embodiment, the framework 100 may be configured to automatically intercept and analyze the input dataset within a machine learning pipeline prior to using the input dataset on a machine learning model.

In one embodiment, the data quality framework 100 is configured with an ensemble of statistical techniques that are performed in conjunction with each other. Each statistical technique used examines a particular characteristic or aspect of the dataset and generates a characteristic metric for that characteristic/aspect. Each characteristic metric depicts the quality of data across its associated aspect. One or more data filters may be included to traverse the data to find and catch features which may hinder the training of ML models during the training phase. Collectively, the characteristic metrics and filters identify and filter aspects of the input dataset that are not suitable for ML models.

In one embodiment, the characteristic metrics (also called "factors") may include (i) an abundance factor that focuses on the quantity of data, (ii) a completeness factor that focuses on a density of the data, and (iii) a dimension efficiency factor that focuses on a dimensionality of the data. These are described in greater detail with reference to FIG. 3.

At block 215, a data quality score is generated based on a harmonic sum of an ensembled combination of the abundance factor, the completeness factor, and the dimension efficiency factor. In one embodiment, the data quality score is configured to be a value in a range between 0 and 1, where 0 is a lowest quality score and 1 is a highest quality score. A quality score close to 1 would indicate an ideal dataset for machine learning. Of course, other score ranges may be used, and the present system is not limited to the disclosed examples.

In one embodiment, a quality threshold value is assigned (based on the score range) to indicate whether the input dataset has a good quality or poor quality. For example, in the example score range between 0 and 1, the quality threshold value may be set at 0.5.

To generate the data quality score, the ensembled combination or harmonic sum is configured to lower the data quality score below the threshold 0.5 when any one of the three factors represents a low metric.

In one embodiment, the data quality score (DQS) is generated using Equation 1:

$$DQS = \cfrac{3}{\cfrac{1}{\text{Abundance Factor}} + \cfrac{1}{\text{Completeness Factor}} + \cfrac{1}{\text{Dimension Efficiency Factor}}} \qquad \text{EQ. 1}$$

Data Quality Score (DQS) is a singular metric that depicts an overall quality of the data being analyzed. The DQS is an aggregation of three other metrics which focus on different characteristics/aspects of the dataset including the quantity (abundance factor), the density (completeness factor) and dimensionality of the data (dimension efficiency factor).

The data quality score provides a high-level, bird's eye view of the data quality as a whole, which can be easily interpreted by a user including non-machine learning experts. The data quality score provides a simple indication whether the collected input dataset should be reconsidered/modified due to apparent poor quality or whether the data quality is good.

In Equation 1, the data quality score includes a numerator that equals the number of factors used. Here there are three (3) factors. The denominator is based on a harmonic sum using three component metrics of the abundance factor, the completeness factor, and the dimension efficiency factor. Each factor is represented as a unit fraction where the numerator is one (1) and the denominator is a positive value from the corresponding factor. The values of these factors are described below.

As a harmonic sum, if any one of the three component metrics drops in value by a significant margin (e.g., meaning that an issue with the data was found), the overall quality score suffers significantly. This ensures a conservative approach, such that all three of the characteristic metrics/factors should have a good score to have a good overall data quality score.

Since each characteristic metric/factor focuses on a particular characteristic of the data, the three characteristic metrics are more granular than the bird's eye view of the data quality score. Each characteristic metric may identify and shed light on which aspect of the data appears to have an issue that affects the overall quality of the collected dataset. This in turn, allows the framework 100 to identify and narrow down potential corrective actions (from many possible corrective actions) that may be recommended to modify and/or correct the input dataset.

Being able to automatically identify specific corrective actions based on the individual characteristic metrics is a further improvement over prior machine learning systems that required guesswork. Prior systems relied upon the subjective guesswork of human ML experts when determining what is wrong with the data and how to correct it. These prior techniques were extremely time consuming, inefficient, inconsistent, and inaccurate since the human ML experts cannot accurately access the quality of millions to billions of data records that may be part of an input dataset.

With continued reference to FIG. 2, at block 220, the generated data quality score is compared to the quality threshold that has been set. In the above example, the quality threshold is set at 0.5 based on the data quality score range between 0 and 1. In response to the data quality score meeting and/or exceeding the quality threshold (e.g., DQS>=0.5), the framework 100 indicates that the input dataset is machine learning ready data (block 225). As a result, the framework 100 also allows the input dataset to continue in the machine learning pipeline and be used to train a machine learning model.

At block 220, in response to the data quality score not meeting the quality threshold (e.g., DQS<0.5), the input dataset is determined as poor quality data and the framework 100 prohibits the input dataset from continuing in the machine learning pipeline. The process moves to block 230 and an alert notification is generated indicating that the input dataset has poor data quality for the machine learning process. The alert notification may be visually displayed on the user interface on a display screen and/or may be generated as part of an output report that describes the data quality score.

At block 235, the process determines, generates, and/or displays one or more corrective actions for improving the quality of the input dataset. In one embodiment, the one or more corrective actions may be identified from a database of corrective actions. For example, different corrective actions are associated with each of the individual characteristic metrics. Additional descriptions are found in the Corrective Actions section below. Since each characteristic metric/factor focuses on a particular characteristic/aspect of the data, a low metric in any of the three different factors identifies a particular issue with the data (e.g., quantity issue, completeness issue, and/or dimensionality issue).

Based on which characteristic metric has a low value (below a designated threshold for the metric), corrective action(s) corresponding to the characteristic metric are identified and retrieved from the database of corrective actions. The retrieved corrective action(s) are then displayed on the user interface and/or generated in an output report that describes the results of the framework 100.

At block 240, based on the identified corrective actions, modification of portions of the input dataset may be performed in an attempt to correct the issue associated with the low characteristic metric (e.g., quantity issue, completeness issue, and/or dimensionality issue). Corrective actions may include removing or filtering out poor data columns. After correction or modification of the input dataset, the process returns to block 205 and the data quality check process 200 is repeated until the input dataset has an updated data quality score that satisfies the quality threshold or until the process is manually terminated.

In another embodiment of the framework 100, at block 210 in FIG. 2, the data quality score is generated based on a combined ensemble of at least two factors selected from: (i) the abundance factor of the input dataset, (ii) the completeness factor of the input dataset, and (iii) the dimension efficiency factor of the input dataset. Equation 1 is thus modified to include the two selected factors rather than all three factors and the numerator is changed to two (2).

Figure 3:
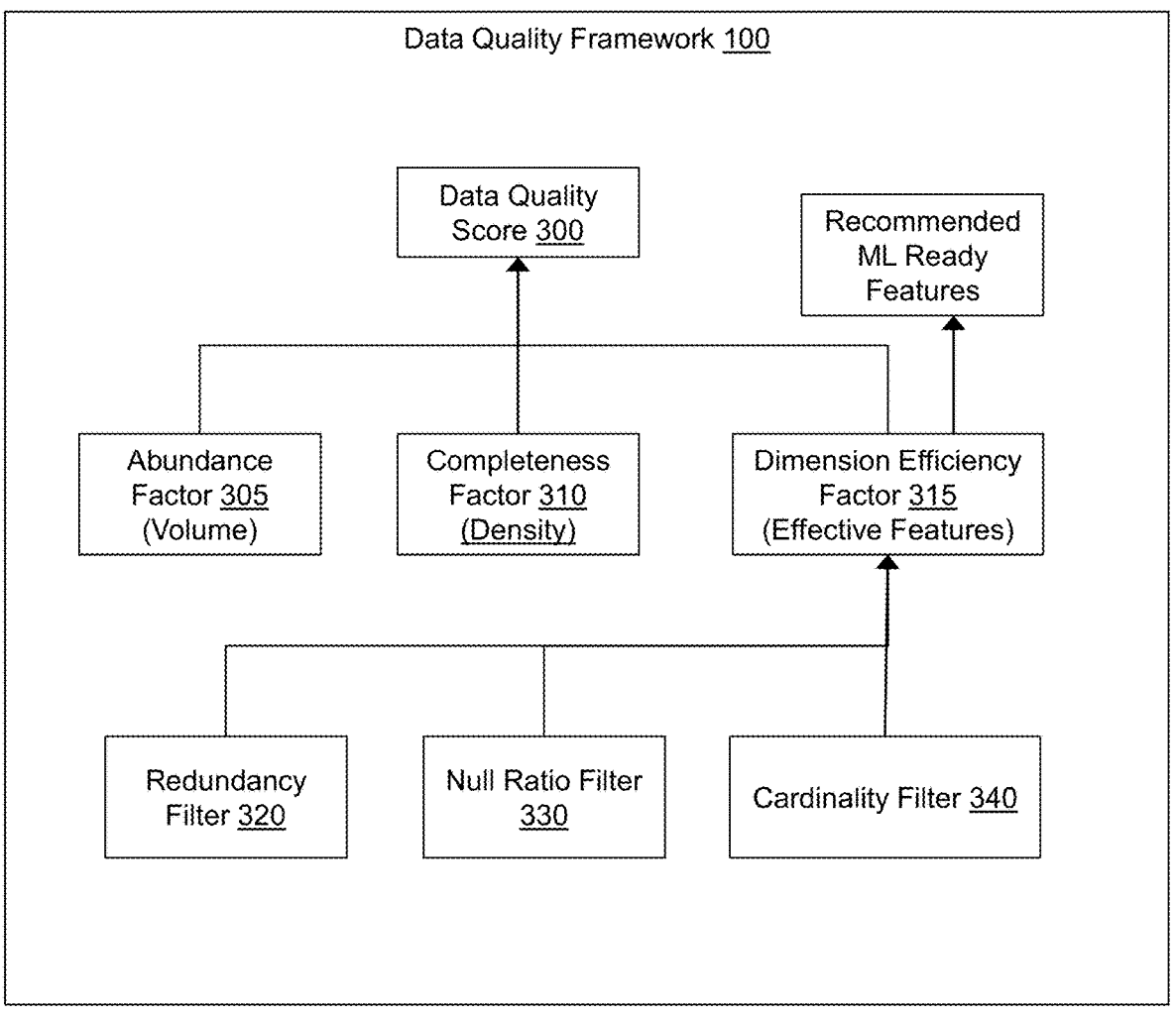
FIG. 3 illustrates components of the data quality framework and data quality score, in one embodiment.

With reference to FIG. 3, one embodiment of a component diagram is illustrated of a data quality score 300 as part of the data quality framework 100. The data quality score 300 is based on components including, but not limited to, an abundance factor 305, a completeness factor 310, and a dimension efficiency factor 315. These factors correspond to the characteristic metrics/factors described with reference to FIG. 2 and are described in more detail herein.

In one embodiment, each of the three characteristic metrics are based on and generated by a corresponding statistical algorithm that analyzes the input dataset for a particular characteristic that may hinder ML model training. The three factors are generally described as follows.

Abundance Factor

In one embodiment, the abundance factor 305 is generated as a first metric that reflects and/or identifies a quantity (volume) characteristic of the input dataset that is available for ML model training. ML models generally require a high amount of data to be trained properly and to gain stability for making predictions for the formulated problem statement. Different ML models tend to have different requirements for the quantity of training data based on complexity.

In one embodiment, the abundance factor 305 may be configured as:

$$\text{Abundance Factor} = \frac{1}{1 + e^{-(abundance - \bar{N})}} \qquad \text{EQ. 2}$$

$$\text{where abundance} = \frac{NUM\# \text{ of records}}{NUM\# \text{ of features}} \qquad \text{EQ. 3}$$

The abundance factor 305 is based on (at least in part) a ratio between a number of data records (NUM # of records) in the input dataset and a number of unique features (NUM # of features) in the input dataset. The abundance factor has a value range between 0 and 1, where 0 represents the poorest (lowest) data quantity and 1 represents the best (highest) data quantity for training purposes.

As previously stated in one embodiment, input dataset is configured as tabular data having rows and columns of data. In a given table, each row represents one data record, and each column represents one feature in the data record. Duplicate features are not counted in the "NUM # of features" variable. Accordingly, an input dataset that has a low number of records, but a high number of features will result in a low (poor) abundance factor score. This means the ML model will not get a good variation of data features for training purposes.

The abundance factor formula (Equation 2) is a modification of a math function called the sigmoid function. Here "e" is called the Euler's number or constant. Its value never changes.

$$\bar{N}$$

is a normalization constant or a "minimum threshold abundance value" which may be identified during an experimentation process (see below) and/or may be obtained from previously determined values. In general, the abundance factor declines in value when the input dataset includes a low number of data records relative to a number of features in the data records. A low score in the abundance factor indicates that the data volume is not good enough for the modelling process and that more data should be collected before moving on to the next phase in the ML pipeline (e.g., ML training phase).

A few examples of the abundance factor are as follows based on different "abundance" values and $$\tilde{N}$$

values that are part of the exponential $$(\text{abundance} - \tilde{N})$$

in the "e" Euler's number in Equation 2:
Case 1:

$$\text{abundance} == \tilde{N}$$

If the abundance value is equal to $$\tilde{N} \ (\text{minimum threshold})$$

then the overall bracket value is equal to "0". In that case "denominator==2", the Abundance Factor will be equal to 0.5, which represents the minimum threshold.
Case 2:

$$\text{abundance} < \tilde{N}$$

If the abundance value is less than $$\tilde{N}$$

(minimum threshold), then the overall bracket value is less than "0", which increases the denominator value (greater than 2) as a whole. In that case, the Abundance Factor will be less than which represents that the data set is not usable.
Case 3:

$$\text{abundance} > \tilde{N}$$

If the abundance value is greater than $$\tilde{N}$$

(minimum threshold), then the overall bracket value is greater than 1, which decreases the denominator value (1<denominator<2) as a whole. In that case, the Abundance Factor will be greater than 0.5, which represents that the dataset is usable.

In one embodiment, to identify the normalization constant $$\tilde{N}$$

the following experiment was conducted over several input datasets.

Figure 4:
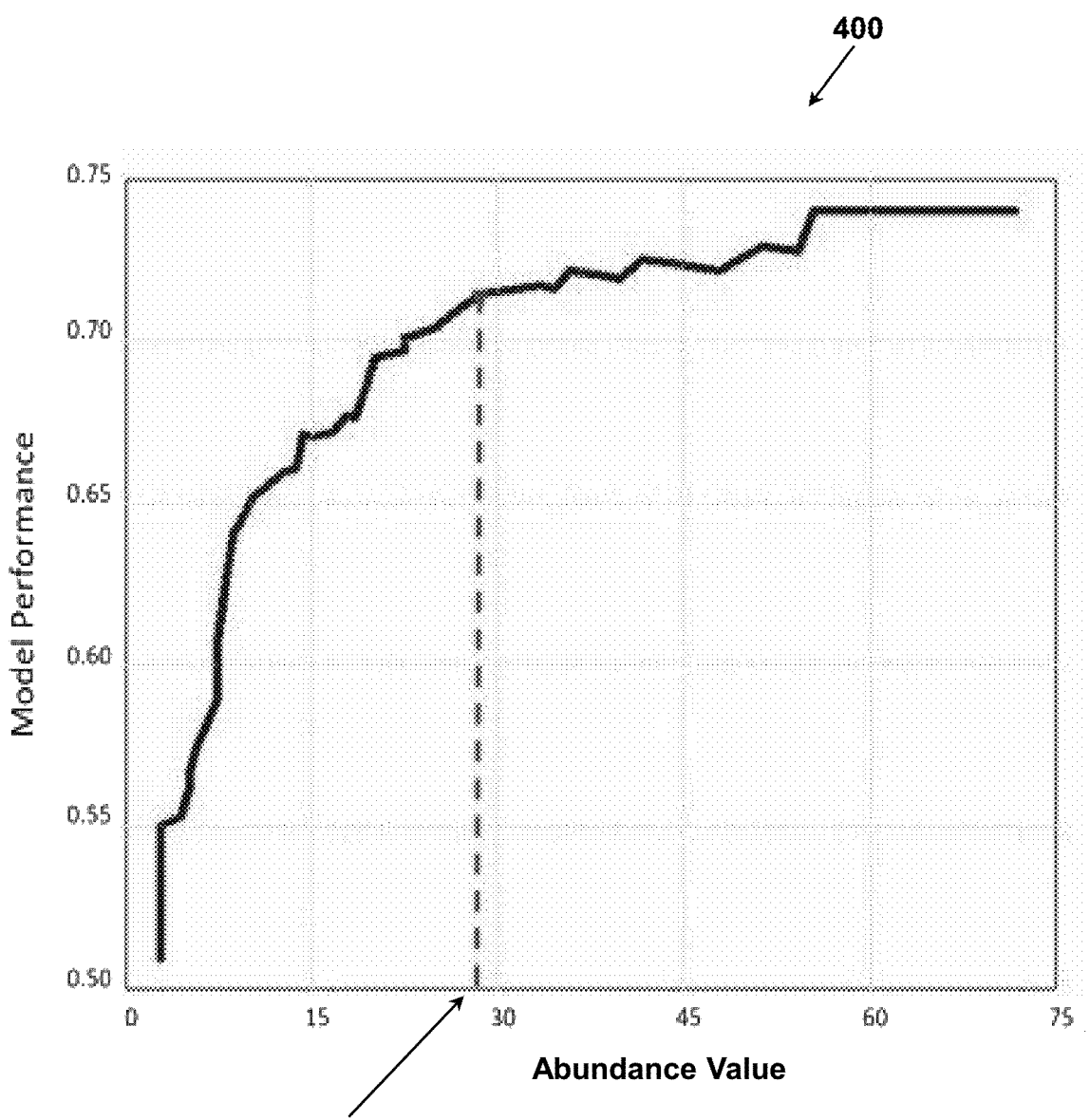
FIG. 4 illustrates an example plotted graph associated with determining a minimum threshold abundance value, in one embodiment.

For a single dataset, an ML model was chosen. The ML model was fed different amounts of data based on the "abundance value" and the performance of the ML model was tracked for many different amounts of data. FIG. 4 illustrates one example of a plotted graph 400 of model performance verses abundance value.

As seen in FIG. 4, once the collected values are plotted, a trend of diminishing returns can be seen and determined. We are interested to find the abundance value after which the model gains stability in terms of performance and does not have significant performance improvement (e.g., where the plotted line begins to remain relatively flat). This point serves as the normalizing constant $$\tilde{N}$$

which is the minimum threshold abundance value 405 for the chosen ML model.

This experiment may be performed across several datasets of similar subject matter for a selected problem statement (e.g., financial datasets) with a number of different ML models that have various complexities. The following observations and trends were found across the datasets and the selected ML models with various complexities for the experimental normalization constant Ñ serving as the minimum threshold abundance value:

$$\tilde{N} > \sim 25 \text{ for Linear ML models (lower complexity)}$$

$$\tilde{N} > \sim 40 \text{ for Non-Linear ML models}$$

$$\tilde{N} > \sim 50 \text{ for Shallow Neural Nets (higher complexity)}$$

Thus, the normalization constant $$\tilde{N}$$

may be set to different values based on the complexity of the selected ML model being trained. In the above examples, the normalization constant increases as the ML model complexity increases. As such, a larger normalization constant reflects that a larger quantity of data should be found in the input dataset to cause the abundance factor to produce a good quality value.

This abundance experiment may also be performed for particular types of ML modes (e.g., regression, binary classification, multiclass classification, etc.) and complexities to identify corresponding minimum abundance threshold values for each different ML model type. A database of abundance threshold values associated to each different ML model type may be maintained.

The data quality framework 100 may then be configured to automatically reassign the normalization constant

11

12

$$\bar{N}$$

in the abundance factor equation based on the type of ML model selected for training in the machine learning pipeline. In one embodiment, a default value may be assigned as the minimum threshold abundance value as $$\bar{N} = 50$$

by taking a conservative approach since more data is not harmful to an ML model.

Completeness Factor

With reference again to FIG. 3, in one embodiment, the completeness factor 310 is generated as a second metric that identifies an average completeness of data records in the input dataset. Completeness of a data record is based on at least an amount of missing data in data columns in the data record, where missing data includes "null" values or no values in a column. The completeness factor declines in value as the amount of missing data increases. In other words, the completeness factor reflects the density of the data.

Completeness is represented by "not null" values in a record. The primary purpose of the completeness factor is to compliment the abundance factor as it is often observed that datasets are quite abundant (large volumes of data) but have too many missing values in records (low density) to be useful during ML model training.

In one embodiment, the completes factor may be found using Equation 4:

$$\text{Completeness Factor} = \frac{\text{Sum (for every row}(NUM\#\,\text{not null columns}))}{NUM\#\,\text{Columns} * NUM\#\,\text{Rows}} \qquad \text{EQ. 4}$$

Here, "NUM # not null columns" is the number of columns in a row that is not null (not missing data) and this number is summed for every row in the dataset. NUM # Columns and NUM # Rows are the number of columns and rows, respectively, that are found in the dataset or data table being analyzed.

It is often observed that a dataset can have a large volume of data with low density (large amounts of missing data values). When using such a dataset for training an ML model, the ML model will struggle to learn the underlying pattern within the data as the lack of density acts as a static noise during the learning process. Therefore, the completeness factor should be as high as possible. With the above equation, the completeness factor has a value range between 0 and 1, where 0 represents the poorest data (very incomplete) and 1 represents the best data (very complete). A completeness factor near value of 1 is ideal.

The completeness factor may be interpreted using a variety of completeness threshold values as follows:

Completeness Factor==1, absolutely no missing data 0.9<Completeness Factor<0.7, some missing data but may be used Completeness Factor<~0.5, too much missing data, not workable If the completeness factor is too low and the dataset is used to train an ML model, the ML model starts learning the noise from the data rather than the actual data pattern itself. A low score in the completeness factor indicates that even if data is abundant, most of the data is riddled with noisy null values. As such, the dataset simply has less density of data patterns for the ML model to learn.

In response to a low completeness factor, one corrective action that may be recommended by the data quality framework 100 includes providing an instruction that the data collection should be redone from more reliable data sources and/or more quality data sources.

Dimension Efficiency Factor

In one embodiment, the dimension efficiency factor 315 is generated as a third metric that represents a ratio of features in the input dataset that pass a filtration process relative to a total number of features in the input dataset. In this characterization of the dataset, features (columns) that are determined to be ineffective for ML model training are filtered out. Being filtered means the identified feature (column) is not counted and may include actually removing the feature (column) from the dataset as a corrective action. The remaining features (columns) pass the filtration are determined to be effective/useful for ML model training. In other words, the dimension efficiency factor is a characteristic metric that depicts the ratio of features in the data which are ready to be used by the ML model. This metric is based on the quality and integrity of the features present in the dataset.

In one embodiment, the dimension efficiency factor (DEF) is found by Equation 5:

$$DEF = \frac{\text{SUM (number of features that pass filtration)}}{\text{Total number of features}} \qquad \text{EQ. 5}$$

The DEF is calculated as a ratio of a number of features that pass a set of filters applied to the input dataset and a total number of features in the input data set. The filtration processes are described below.

With continued reference to FIG. 3, in one embodiment, values for the DEF 315 are based on a selected group of filters that are applied to the input dataset and used in conjunction with each other to filter certain features that are ineffective or not useful for ML model training. The filters include, but are not limited to, a combination of two or more filters: a redundancy filter 325, a null ratio filter 330, and a cardinality filter 340. In one embodiment, all three filters are used. The combination of filters devises the DEF metric to represent the effective features that are ML ready in the dataset by filtering out the ineffective features. The number of features that pass the filtration (are not filtered out) are summed in equation 5.

The filters assert specified restrictive assumptions of ML model training over the data and filter the data accordingly. Having a low score in the dimension efficiency factor represents that a significant number of features are not useful for the ML training/modelling process. In other words, the data is characterized as having too many ineffective features for training purposes.

In one embodiment, the DEF has a value range between 0 and 1, where 0 represents the lowest score (all features are ineffective and were filtered out) and 1 represents the best score (all features are effective and none were filtered out). Ideally, the value of DEF should be as close to 1 as possible.

A low score in this metric suggests that there are too many features that would not add significant value to the ML modelling process and perhaps may even be detrimental. In response to a low DEF, one corrective action that may be recommended by the data quality framework 100 includes providing an output that identifies the ineffective features (e.g., display visually on display) and/or provide an instruction that different features should be selected for use in the input dataset and/or the data collector should be more cautious about selecting irrelevant features as part of the input dataset.

In another embodiment, the filtration process of the dimension efficiency factor is configured to perform a combination of corrective actions: (i) identifying and removing redundant columns in the input dataset; and/or (ii) identifying and removing columns with an amount of missing values that exceeds a threshold.

The filters that may be used by the dimension efficiency factor (DEF) are described as follows, in one embodiment.

Redundancy Filter

The redundancy filter 320 (FIG. 3) is a filter that iteratively traverses data in the input dataset (data tables with rows and columns) and labels features (e.g., columns) that are redundant. Redundancy of data adds uncertainty to ML model parameters. Moreover, it adds to the time complexity of the ML model.

For example, suppose an ML problem statement involved finding a total amount owed in accounts with a formula: Total Amount=Principal Amount+Interest Amount+Overdue Penalty. Consider that the input dataset includes columns for each value. In this case, the Total Amount column is redundant because its value is clearly explained and determined by other column features: principal amount column, interest amount column, and overdue penalty column.

In one embodiment, the redundancy filter 320 is configured based on a conservative approach to only remove a minimum number of features while removing maximum redundancy. For this, the redundancy filter is implemented with a statistical technique called Iterative Variance Inflation Factor (VIF).

Iterative VIF calculates the predictability of a feature based on the other features in the dataset. Thus, in the above example, the "Total Amount" is predictable because it can be determined based on the other features. This allows the filter to find the features (some of which are variables) that are redundant and can be removed from the dataset. In the Iterative VIF method, the VIF of each feature is calculated after every elimination of a feature/variable to ensure cumulative integrity.

In one embodiment, VIF (feature/variable)=$1/(1-R^2)$.

$R^2$, pronounced "R squared", is a proportion of the variation in the dependent variable that is predictable from the independent variable(s).

A VIF value of 1 means that the predictor is not correlated with other variables. The higher the value, the greater the correlation of the variable with other variables. In one embodiment, a VIF (feature)>5 is considered highly predictable from other features and thus redundant. Therefore, any feature having VIF greater than 5 is filtered out by the redundancy filter 320.

Upon completion of the redundancy filter 320, the number of remaining features (not filtered features) is returned to the dimension efficiency factor 315 to be included in the sum of the number of features that pass the filtration processes in equation 5.

Null Ratio (Missing Value) Filter

The null ratio filter 330 (FIG. 3), also called a missing value filter, is a filter that traverses through each feature of the dataset and filters the features (columns) having unacceptable levels of missing values.

Generally, ML models can handle missing values to a small extent. However, missing values add noise to the actual underlying pattern of data. Therefore, filtering out features (columns) that add more noise than actual data improves the dataset and improves the ML model training process.

In one embodiment, the null ratio filter 330 is configured to determine a missing value ratio (MVR) for each column in the input data set. The missing value ratio essentially identifies the features/columns which are adding more noise (null values) than actual values, and recommends those features for elimination from the dataset by labeling the feature. For example:

$$MVR\ (\text{feature}) = \frac{NUM\#\ \text{of null values in column}}{\text{Total number of values in column}} \qquad \text{EQ. 6}$$

The following is one embodiment of threshold values that may be set for labelling features/columns for elimination based on MVR values:

MVR==0, ideal condition (no missing values, feature not labelled)

0.1<MVR<0.3, could be handled by ML model (not labelled)

MVR>0.4, not acceptable (too many missing values, feature is labelled for elimination/filtering)

The features/columns found to have an amount of missing values that exceed the threshold (e.g., MVR>0.4) are labelled as such and are filtered out. After all features in the input dataset are traversed by the null ratio filter 330, the number of remaining features (not filtered features) is returned to the dimension efficiency factor 315 to be included in the sum of the number of features that pass the filtration processes in equation 5.

Cardinality Filter

The cardinality filter 340 (FIG. 3) is a filter that traverses the input data set and identifies categorical features that have too many distinct categories or distinct values (too many dimensions). These types of features should be filtered as they can amplify a situation of garbage data that is ineffective for ML model training. In one embodiment, the cardinality filter 340 is configured to traverse each column in the dataset and count the number unique data values or unique categories that are found in the column.

For example, columns that have a large number of unique values are ineffective for ML model training because the ML model cannot learn any data pattern from the column values. The column values are basically noise. One example is a column of account numbers. In a financial dataset, there may be a million customer records (rows) and a column for account number. Each account number will be unique. Thus, there is no data pattern for the ML model to learn from a million unique account numbers. A column of employee names or a column of birthdates would also have a large number of unique values and no underlying data pattern. These type of features/columns often exponentially increase the dimensions of the dataset without adding much value to predictive modelling.

In one embodiment, the cardinality filter 340 is configured to determine a New Abundance value for each feature (column) in the input dataset. With reference to FIG. 5, one example of a cardinality table 500 is illustrated that may be associated with determining whether a column feature has too many distinct categories or distinct values. For a given column being analyzed, a table is generated. The analyzed column is shown as column 505 and includes rows for each value found in the column. For each unique value found, a new column (a dimension) is created in the cardinality table 500.

In the example of FIG. 5, there are four (4) unique values (or distinct categories) found in column 505, namely value 1, value 2, value 3, and value 4. Thus, four (4) new columns 510 are generated in the table 500. Each value in the new columns 510 is either 1 or 0, which represents which rows the corresponding value was found in (="1") or not found (="0"). Adding up the number of new columns 510 created gives the number of dimensions (unique values) in the column 505 being analyzed. Adding up the number of 1's in each column gives the number of times the corresponding value was found. For example, "Value 3" was found two times.

Using the cardinality table 500 of the column/feature 505 being analyzed, the system calculates a New_Abundance value using the same or similar process as described with the abundance factor 305. The system determines whether this column/feature 505 breaks (goes beyond) the minimum threshold abundance value N as described previously. If so, the feature is filtered out by the cardinality filter 340 as it will break the minimum required volume of data for ML modelling by adding too many data dimensions.

In one embodiment, the data quality framework 100 and the cardinality filter 340 are configured to identify and label the features which have an "Abundance Breaking" level of cardinality. This means that if such a feature is allowed to stay during the model training phase, the feature will break the abundance of the data by exploding in terms of features.

The following is applied to the cardinality table 500 of the column being analyzed:

$$NewAbundance = \frac{NUM\# \text{ of records}}{NUM\# \text{ of Features} + \text{Cardinal Dimensions}} \quad \text{EQ. 7}$$

A feature has high cardinality when NewAbundance<Ñ, where Ñ is the minimum threshold abundance value assigned as described from the abundance factor 305.

Thus, when the "NewAbundance" calculated after preprocessing the cardinality of a feature is less than Ñ, then the feature is labelled as "High Cardinality" and is filtered out.

After all features in the input dataset are traversed by the cardinality filter 340, the number of remaining features (not filtered features) is returned to the dimension efficiency factor 315 to be included in the sum of the number of features that pass the filtration processes in equation 5.

Recommended ML-Ready Features

After applying the filters from the dimension efficiency factor 315, the features determined to be ineffective for ML training are filtered out. The remaining features form a set of recommended ML-ready features 345. The ML-ready features 345 are, thus, identified from the filtering process and may be counted to provide statistics for an analysis report. The ML-ready features 345 are a subset of the total features from the input dataset that are determined to be effective and ready for the machine learning process. These may be included as part of recommendations generated by the data quality framework 100. The other ineffective features (causing low quality issues as identified by the filters) may be removed autonomously to improve the effectiveness and quality of the input dataset.

In one embodiment, the ineffective features identified and filtered by the filtration process may be automatically removed from the input dataset as part of a corrective action. This results in creating a modified version of the input dataset. This improves the overall data quality score 300 and creates a higher quality input dataset for training the ML model.

Sample Report

With reference to FIG. 6, one embodiment of a sample report 600 is illustrated that may be generated and displayed by the data quality framework 100 after analyzing an input dataset.

Corrective Actions

In one embodiment, in response to the data quality score being below the quality threshold, one or more corrective actions may be identified and performed. These corrective actions may be part of the corrective actions in FIG. 2 (blocks 235 and 240).

Since the data quality framework 100 uses three different data characteristic metrics (abundance factor 305, completeness factor 310, and dimension efficiency factor 315), there are at least three possible ways of improving the data quality score based on which factor(s) identified issues in the dataset. Each corrective action is directed to resolving or at least improving one of the characteristic metrics associated with overall score, low quantity of data, incomplete data, or poor dimension efficiency.

It is noted that some datasets, such as financial datasets, are generally an amalgamation of several smaller individual component datasets collected from different data sources (e.g., different departments). The smaller component datasets are generally fetched from different data sources on an ad-hoc basis and submitted together as a whole for analysis by the data quality framework 100. Thus, the data quality score is for the entire dataset as a whole.

In response to a poor data quality score, the corrective action(s) may first involve separating the entire bulk dataset into the smaller individual component datasets and repeating execution of the data quality framework 100 on each smaller component dataset. As such, each smaller component dataset receives its own data quality score and associated data characteristic metrics: abundance factor 305, completeness factor 310, and dimension efficiency factor 315. In this manner, the data quality framework 100 may identify which smaller component datasets contain poor quality data as opposed to performing complex actions over the entire bulk dataset.

For each corrective phase, there is at-least one autonomous step where the data quality framework performs the corrective action over each component data source to improve the overall data quality.

Based on the metrics of the component datasets, the framework 100 can identify which component datasets (and the data sources they came from) are poor component datasets and what type of quality issue they have. Then, corrective actions may be autonomously performed over the smaller component dataset.

Corrective Actions for Poor Abundance Factor

As stated above, when the entire bulk dataset receives a poor data quality score, the data quality framework 100 is executed on each smaller component dataset. In one embodiment, in response to a smaller component dataset receiving a poor/low abundance factor 305, one or more of the following corrective actions may be performed:

1. Automatically remove the component dataset and its data source causing the low abundance factor.

2. Automatically remove redundant features to improve abundance factor.

3. Provide instructions to identify new/different data sources which may improve the abundance factor.

For example, a first corrective action may include simply eliminating/removing the poor component dataset from the entire bulk dataset. Eliminating a poor component is likely to improve the data quality score of the entire bulk dataset.

If the first corrective action does not raise the data quality score sufficiently for the entire bulk dataset, then the data quality framework 100 continues to the second corrective action. The second corrective action includes filtering out the feature(s) which are not relevant as identified by the data quality framework in the first pass. This would also improve the abundance factor of the bulk data.

The third corrective action may also be performed, which includes providing instructions to a user to discover a new/alternative data source from some other department/office/database and obtain a replacement component dataset. This may or may not improve the data quality score of the bulk data.

In another embodiment, the data quality framework 100 is configured to generate one or more corrective actions by: determining that the input dataset (bulk) is comprised of data collected from a plurality of data sources (components). A data quality score is determined for each of the plurality of data sources and identify a first data source from the plurality of data sources that is determined to have a low data quality score. The data quality framework 100 may then modify the input dataset (bulk) by removing the first data source from the input dataset (bulk). Execution of the data quality framework 100 is then repeated on the modified input dataset (bulk) to determine if the data quality score has improved.

Correction Actions for Poor Completeness Factor

In one embodiment, in response to a smaller component dataset receiving a poor/low completeness factor 3105, one or more of the following corrective actions may be performed:

1. Automatically remove the component dataset (and its data source) causing the low completeness factor.

2. Automatically impute edge cases affecting the completeness factor.

3. Provide instructions for a user to identify/define new data sources or methods which can improve the completeness factor.

Similar to abundance factor, when a poor data quality score is received due to a poor completeness factor, the data quality framework backtracks and executes on the component datasets (component data sources). One objective of the first corrective action in this situation is to identify the data source which is causing the drop in the completeness factor and then remove it. Removing such a component data source will likely improve the overall data quality score of the bulk dataset but does not guarantee it.

If the first corrective action does not succeed in improving the data quality score of the bulk dataset, a second corrective action is implemented by the framework that aims to impute the "records" from the bulk dataset which have more than 50% missing values in them. This almost guarantees improvement in the data quality of the bulk dataset. A 50% threshold ensures that the compromise over the "real data" is as minimum as possible.

Correction Actions for Poor Dimension Factor

In one embodiment, in response to the entire dataset (bulk) receiving a poor/low dimension efficiency factor 315, the following corrective actions may be performed:

1. Automatically remove existing filtered features causing low Dimension Efficiency Factor.

Recall that the dimension efficiency factor 315 directly depends upon the ML-ready features found in the entire dataset (bulk) based on the filtering process as previously explained. One way to improve the dimension efficiency factor is to simply filter out the ineffective feature columns that were determined as not ML ready. Filtering out the ineffective feature columns will improve the dimension efficiency factor.

The benefits to having quality training data are well-known. The present data quality framework 100 combines and implements a set of statistical data analysis methods to create a novel system for assessing and correcting data quality for machine learning pipelines.

Cloud or Enterprise Embodiments

In one embodiment, the data quality framework 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the data quality framework 100 is a centralized server-side application that provides at least the functions disclosed herein and that is accessed by many users via computing devices/terminals communicating with data quality framework 100 (functioning on a server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 7:
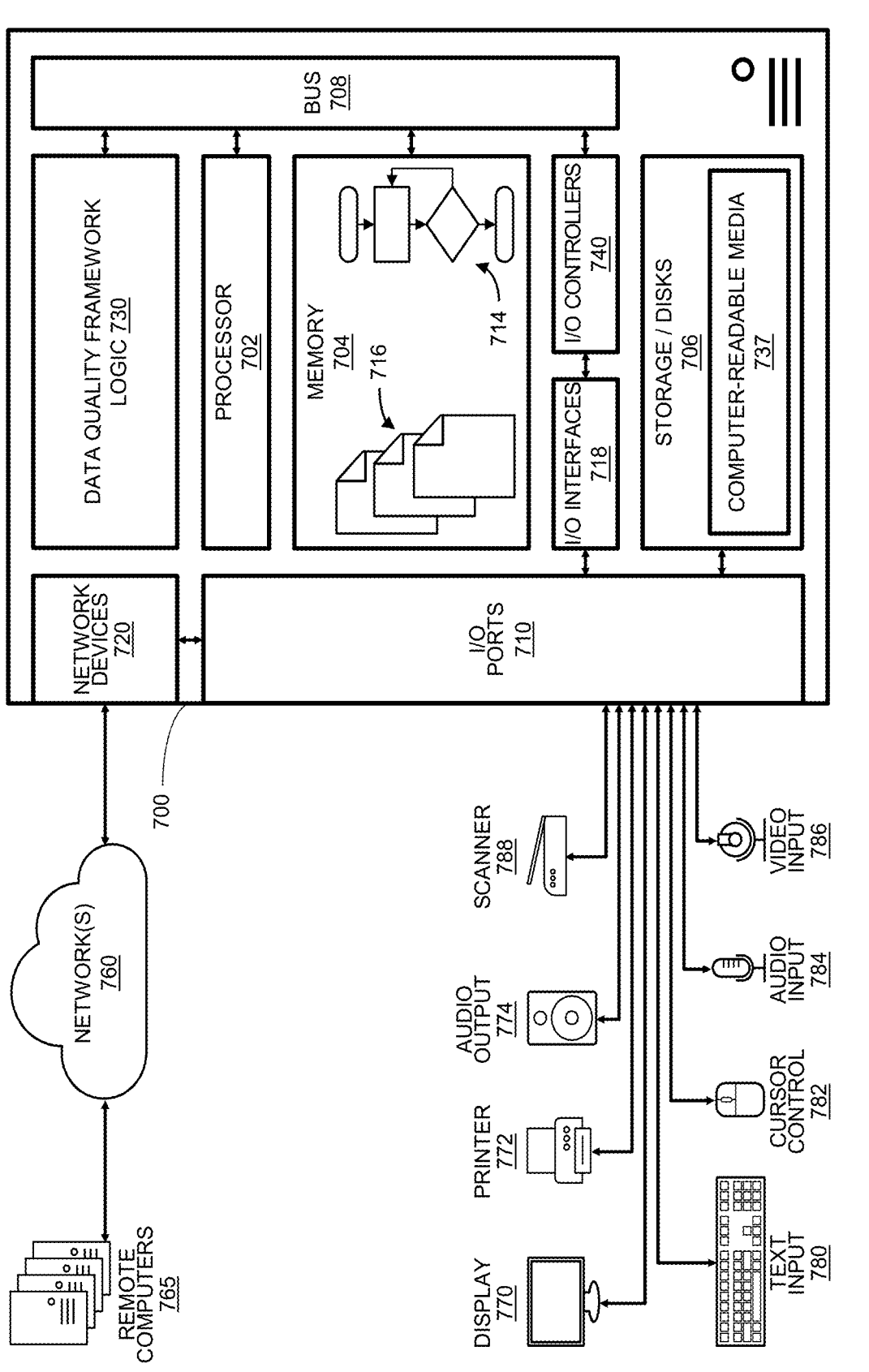
FIG. 7 illustrates an embodiment of a computing system configured with the example systems and/or methods disclosed.

FIG. 7 illustrates an example computing device that is configured and/or programmed as a special purpose computing device with one or more of the example systems and methods described herein, and/or equivalents. The example computing device may be a computer 700 that includes at least one hardware processor 702, a memory 704, and input/output ports 710 operably connected by a bus 708. In one example, the computer 700 may include data quality framework logic 730 configured to facilitate data quality assessment and corrective actions similar to the data quality framework system 100 shown in FIGS. 1, 2, and/or 3.

In different examples, the logic 730 may be implemented in hardware, a non-transitory computer-readable medium 737 with stored instructions, firmware, and/or combinations thereof. While the logic 730 is illustrated as a hardware component attached to the bus 708, it is to be appreciated that in other embodiments, the logic 730 could be implemented in the processor 702, stored in memory 704, or stored in disk 706.

In one embodiment, logic 730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to the data quality framework. The means may also be implemented as stored computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output (I/O) interface (e.g., card, device) 718 and an input/output port 710 that are controlled by at least an input/output (I/O) controller 740. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The computer 700 may interact with, control, and/or be controlled by input/output (I/O) devices via the input/output (I/O) controller 740, the I/O interfaces 718, and the input/output ports 710. Input/output devices may include, for example, one or more displays 770, printers 772 (such as inkjet, laser, or 3D printers), audio output devices 774 (such as speakers or headphones), text input devices 780 (such as keyboards), cursor control devices 782 for pointing and selection inputs (such as mice, trackballs, touch screens, joysticks, pointing sticks, electronic styluses, electronic pen tablets), audio input devices 784 (such as microphones or external audio players), video input devices 786 (such as video and still cameras, or external video players), image scanners 788, video cards (not shown), disks 706, network devices 720, and so on. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network 760. Through the network, the computer 700 may be logically connected to remote computers 765. Networks with which the computer 700 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which data, signals, physical communications, and/or logical communications may be sent and/or received between the entities. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium, network channel). Logical and/or physical communication channels can be used to create an operable connection to communicate data.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system, comprising:
   at least one processor connected to at least one memory;
   a machine learning pipeline configured to receive an input dataset and train a machine learning model using the input dataset;
   a data quality framework operably connected to the machine learning pipeline and configured to control flow of the input dataset in the machine learning pipeline prior to using the input dataset on the machine learning model;
   wherein the data quality framework is further configured to determine a data quality of the input dataset prior to training the machine learning model;
   wherein the data quality framework includes instructions stored on a non-transitory computer readable medium that when executed by at least the processor cause the processor to:
   generate a data quality score that represents an overall quality of the input dataset;
   wherein the data quality score is generated based on a harmonic sum of (i) an abundance factor of the input dataset that is based on a ratio between a number of data records in the input dataset and a number of features in the input dataset, (ii) a completeness factor of the input dataset, and (iii) a dimension efficiency factor of the input dataset;
   in response to the data quality score not meeting a quality threshold, change the flow of the input dataset in the machine learning pipeline by prohibiting the input dataset from continuing in the machine learning pipeline; and
   generate a notification of poor data quality and generate one or more corrective actions for improving the data quality of the input dataset; and
   in response to the data quality score meeting the quality threshold, control the flow of the input dataset by allowing the input dataset to continue in the machine learning pipeline and be used to train the machine learning model.

2. The computing system of claim 1, wherein the instructions for generating the data quality score are further configured to, when executed by at least the processor, cause the processor to:
   generate the abundance factor as a first metric wherein the abundance factor declines in value when the input dataset includes a low number of data records relative to a number of features in the data records;
   generate the completeness factor as a second metric that identifies an average completeness of data records in the input dataset based on at least an amount of missing data from data columns in the data records, wherein the completeness factor declines in value as the amount of missing data increases; and generate the dimension efficiency factor as a third metric that represents a ratio of features in the input dataset that pass a filtration process relative to a total number of features in the input dataset.

3. The computing system of claim 2, wherein the filtration process of the dimension efficiency factor is configured to include a combination of a redundancy filter, a null ratio filter, and a cardinality filter.

4. The computing system of claim 1, wherein the input dataset is in a tabular format and includes data records that are independent of each other.

5. The computing system of claim 1, wherein the data quality framework is configured to generate the data quality score based on the harmonic sum calculated as:

three divided by a sum of reciprocals 1/(the abundance factor)+1/(the completeness factor)+1/(the dimension efficiency factor).

6. The computing system of claim 1, wherein the data quality framework is configured to generate the data quality score based on an ensemble-based combination of three factors including (i) the abundance factor of the input dataset, (ii) the completeness factor of the input dataset, and (iii) the dimension efficiency factor;

wherein the data quality score is a value between 0 and 1, where 0 is a lowest quality score and 1 is a highest quality score;

wherein the ensemble-based combination is configured to lower the data quality score below a quality threshold when any one of the three factors represents a low metric.

7. The computing system of claim 1, wherein the data quality framework is configured to generate the one or more corrective actions as:

determine that the input dataset is comprised of data collected from a plurality of data sources;

determine the data quality score for data from each of the plurality of data sources;

identify a first data source from the plurality of data sources that is determined to have a low data quality score; and modify the input dataset by removing the first data source from the input dataset; and repeat execution of the data quality framework on the modified input dataset.

8. A computer-implemented method, the method comprising:

intercepting an input dataset in a machine learning pipeline prior to training a machine learning model with the input dataset in the machine learning pipeline;

analyzing the input dataset having data records in column tabular form, to determine a data quality of the input dataset prior to training the machine learning model;

generating a data quality score that represents an overall quality of the input dataset;

wherein the data quality score is generated based on a combined ensemble of at least two factors selected from: (i) an abundance factor of the input dataset, (ii) a completeness factor of the input dataset, and (iii) a dimension efficiency factor of the input dataset;

in response to the data quality score not meeting a quality threshold:

changing information flow in the machine learning pipeline by prohibiting the input dataset from continuing in the machine learning pipeline;

generating and displaying a notification of poor data quality of the input dataset; and generating one or more corrective actions for improving the data quality of the input dataset including at least modifying one or more portions of the input dataset; and in response to the data quality score meeting the quality threshold, controlling the information flow in the machine learning pipeline by allowing the input dataset to continue in the machine learning pipeline and be used to train the machine learning model.

9. The method of claim 8, wherein the data quality score is generated based on the combined ensemble of at least two selected factors as:

a number of selected factors divided by a sum of reciprocals of a value of each selected factor including 1/(value of first factor selected)+1/(value of second factor selected).

10. The method of claim 8, wherein the abundance factor identifies a quantity characteristic of the input dataset and is based on, at least in part, a ratio between a number of data records in the input dataset and a number of features in the input dataset; and wherein the method further comprises:

determining a type of model of the machine learning model being trained in the machine learning pipeline; and assigning a minimum threshold abundance value to the abundance factor based on the type of model.

11. The method of claim 8, wherein generating the data quality score further comprises:

generating the abundance factor as a first metric that is based on a ratio between a number of data records in the input dataset and a number of features in the input dataset;

wherein the abundance factor declines in value when the input dataset includes a low number of data records relative to a number of features in the data records;

generating the completeness factor as a second metric that identifies an average completeness of data records in the input dataset based on at least an amount of missing data from data columns in the data records, wherein the completeness factor declines in value as the amount of missing data increases; and generating the dimension efficiency factor as a third metric that represents a ratio of features in the input dataset that pass a filtration process relative to a total number of features in the input dataset.

12. The method of claim 11, wherein the filtration process of the dimension efficiency factor is configured to include a combination of:

(i) identifying and removing redundant columns in the input dataset; and (ii) identifying and removing columns with an amount of missing values that exceeds a threshold.

13. The method of claim 8, wherein the input dataset is in a tabular format including rows of data records and columns of features.

14. The method of claim 8, wherein the data quality score is generated based on a harmonic sum calculated as:

three divided by a sum of reciprocals 1/(the abundance factor)+1/(the completeness factor)+1/(the dimension efficiency factor).

15. The method of claim 8, wherein generating the one or more corrective actions further comprises:

separating the input dataset into a plurality of individual component datasets that are from different data sources;

repeating execution of generating the data quality score that represents an overall quality for each of the individual component datasets; and in response to identifying one component dataset from plurality of individual component datasets not meeting the quality threshold, removing the one component dataset from the input dataset.

16. A non-transitory computer-readable medium that includes stored thereon computer-executable instructions that when executed by at least a processor of a computer cause the computer to:

receive, from a machine learning pipeline, an input dataset prior to training a machine learning model with the input dataset in the machine learning pipeline;

analyze the input dataset having data records in column tabular form, to determine a data quality of the input dataset prior to training the machine learning model;

generate a data quality score that represents an overall quality of the input dataset based on the analyzing of the input dataset;

wherein the data quality score is generated based on a harmonic sum of at least two factors selected from: (i) an abundance factor of the input dataset, (ii) a completeness factor of the input dataset, and (iii) a dimension efficiency factor of the input dataset;

in response to the data quality score not meeting a quality threshold:

change information flow in the machine learning pipeline by prohibiting the input dataset from continuing in the machine learning pipeline;

perform corrective actions to create a modified input dataset based on the at least two factors including: (i) identifying and removing redundant columns in the input dataset, and (ii) identifying and removing columns with an amount of missing values that exceeds a threshold;

repeat analyzing the modified input dataset and generate an updated data quality score; and control information flow of the modified input dataset through the machine learning pipeline based on at least the updated data quality score.

17. The non-transitory computer-readable medium of claim 16, further comprising instructions that when executed by at least the processor cause the processor to:

in response to the data quality score meeting the quality threshold, control the information flow in the machine learning pipeline by allowing the input dataset to continue in the machine learning pipeline and be used to train the machine learning model.

18. The non-transitory computer-readable medium of claim 16, wherein the instructions for generating the data quality score are further configured to, when executed by at least the processor, cause the processor to:

generate the abundance factor as a first metric that is based on a ratio between a number of data records in the input dataset and a number of features in the input dataset;

generate the completeness factor as a second metric that identifies an average completeness of data records in the input dataset based on at least an amount of missing data from data columns in the data records, wherein the completeness factor declines in value as the amount of missing data increases; and generate the dimension efficiency factor as a third metric that represents a ratio of features in the input dataset that pass a filtration process relative to a total number of features in the input dataset.

19. The non-transitory computer-readable medium of claim 16, further comprising instructions that when executed by at least the processor cause the processor to:

generate the data quality score from:

three divided by the harmonic sum of 1/(the abundance factor)+1/(the completeness factor)+1/(the dimension efficiency factor).

20. The non-transitory computer-readable medium of claim 16, wherein the instructions to perform the corrective actions further comprise instructions that when executed by at least the processor cause the processor to:

separate the input dataset into a plurality of individual component datasets that are from different data sources;

repeat execution of generating the data quality score that represents an overall quality for each of the individual component datasets; and in response to identifying one component dataset from plurality of individual component datasets not meeting the quality threshold, remove the one component dataset from the input dataset to remove the one component from the machine learning pipeline.

\* \* \* \* \*